W. L. WILLIAMS.
Velocipede.
No. 111,597.                Patented Feb. 7, 1871.
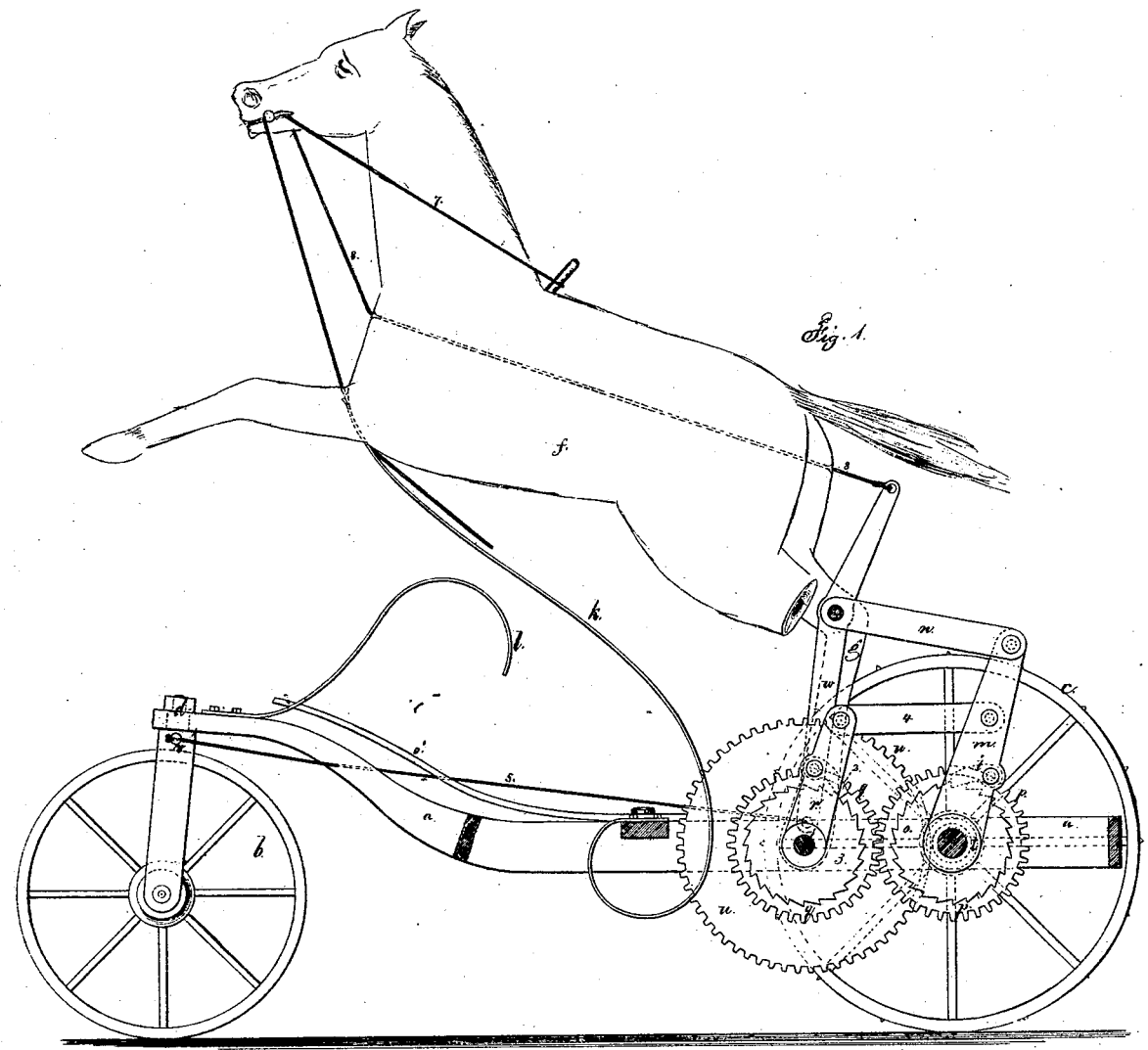
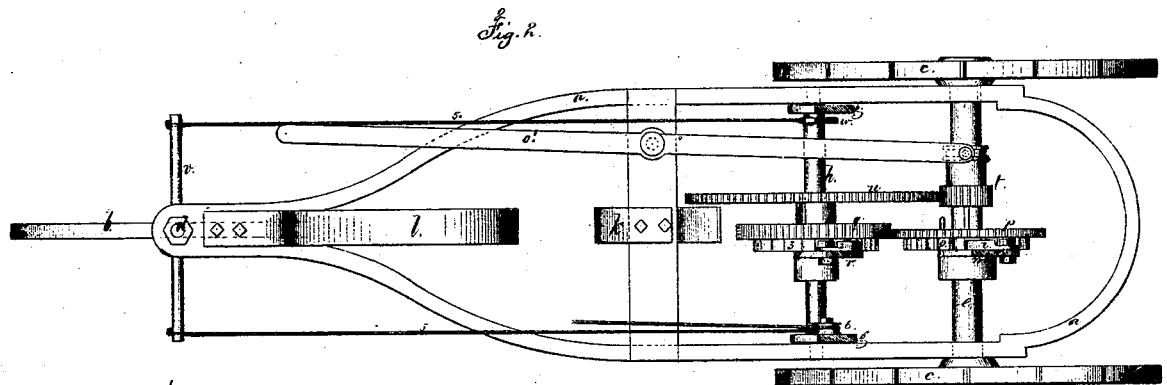

United States Patent Office.

WILLIAM L. WILLIAMS, OF NEW YORK, N. Y.

Letters Patent No. 111,597, dated February 7, 1871; antedated January 25, 1871.

IMPROVEMENT IN VELOCIPEDES.

The Schedule referred to in these Letters Patent and making part of the same.

*To all whom it may concern:*

Be it known that I, WILLIAM L. WILLIAMS, of the city and State of New York, have invented and made a new and improved Hobby-Horse and Velocipede; and the following is declared to be a correct description thereof.

Velocipedes have been made with a seat or body resembling a horse, and treadles at the sides, and the body of the horse has been made to rise and fall with the movement of the rider, and these motions have been communicated to the axle of the driving-wheels by cranks in some instances, by pawls and ratchet-wheels in other instances, and also by clamps or pawls and an endless chain.

My invention, as distinguished from the before-named devices, relates to an arrangement of pawls and levers connected to the hobby-horse in such a manner that two wheels gearing into each other shall be rotated progressively by both the upward and the downward movements of the hobby or spring-horse; and I arrange the parts in such a manner, in connection with gearing and couplings, that a fast movement can be given for rotating the wheels upon level ground, and a slower and correspondingly powerful rotation can be given to the wheels when going up hill, and when going down hill the horse may remain at rest as the wheels revolve.

This hobby or spring-horse may be used without the wheels rotating.

In the drawing—

Figure 1 is an elevation of my hobby-horse, with the wheel part of the frame and the leg on one side removed to show the gearing; and Figure 2 is a plan, with the hobby-horse itself removed.

The frame $a$ is supported by the wheels $b$ and $c$ $c$, the front wheel or wheels being mounted upon a pivot, $d$, so as to be moved in steering, and the wheels $c$ $c$ are attached to the axle or shaft $e$.

The horse $f$ is fitted to swing or oscillate the connection thereof to the frame $a$, being at the lower ends of the hind legs $g$, to the shaft or bar $h$ or other convenient place of attachment.

The springs $k$ $l$ serve to raise the horse and rider upon the upward movement.

The lever $m$ swings upon the axle $e$, and is connected by the rod $n$ to the leg $g$, so as to be moved by the horse.

Upon this lever $m$ is a pawl, $i$, taking the ratchet-teeth $o$ upon the side of a wheel, $p$, that gears into a second wheel, $q$, that is set to revolve upon the shaft $h$, and is provided with ratchet-teeth 3 acted upon by the pawl 2 of the lever $r$, which lever $r$ is connected by the rod 4 with the lever $m$.

It will now be understood that, by this arrangement, the wheels $p$ and $q$ will be revolved almost continuously by the movement of the horse, the pawl $i$ acting as the horse swings down, and the pawl 2 as the horse rises.

If, therefore, the wheel $p$ is connected to the shaft $e$ the velocipede will be propelled forward, and in going down hill the wheel $p$ can revolve and the horse remain quiescent, and to control the movement any suitable brake may be employed; and it will be evident that, in place of ratchets and pawls, clamps acting upon a ring or flange similar to those in the wheel-feed of a sewing-machine may be used, or the pawls may act directly upon the teeth of the gear-wheels $p$ $q$.

In order to connect the wheel $p$ to the shaft $e$ any suitable means may be employed, such as a key and slot; however, to allow of the use of the other parts hereinafter set forth, I employ the coupling $t$ that is slid upon a feather or key on the shaft $e$, by means of the lever $o'$, that can be operated by the foot or otherwise.

This coupling $t$ is made as a pinion-gearing to the wheel $u$ that is upon the shaft $h$, but permanently connected with the wheel $q$.

The parts are so made that the pinion $t$ will not be in contact with the wheel $u$ when it is coupled with the wheel $p$, and said pinion $t$ can also stand so as not to be connected to or coupled with the wheel $p$ or the wheel $u$, in which position the horse can be used as a hobby or spring-horse, and the wheels will not be moved, and with the parts in this position the horse may run down hill without the gearing being operated.

When the pinion-coupling $t$ is in gear with the wheel $u$, a quicker revolution of the axle $e$ and wheels $c$ $c$ will be obtained.

In order to steer the velocipede by a bridle I employ a cross-head $r$ upon the front wheels with cords or rods running closely above the cross-shaft $h$ as at 5 5, and there the said cords or rods pass around the pulley 6, and thence to the horse's head and bridle 7, or else to the lower end of a lever, $w$, from the upper end of which lever a cord or rod passes to the horse's head and rein; in the latter case the upper cord 8 passes through the body of the horse.

By this arrangement the swinging or cantering of the horse does not slacken or tighten the rein, and the velocipede can be easily steered by the person sitting upon the horse.

I claim as my invention—

1. The wheel $q$, gearing to the wheel $p$ upon the axle $e$, in combination with the levers $m$ and $r$, and ratchets or clamps connected with the swinging hobby-horse, the parts being arranged and acting substantially as set forth.

2. The coupling-pinion $t$ and gear-wheel $u$, in combination with the wheels $p$ and $q$ and connections to the swinging horse $f$, the parts being arranged and acting substantially as and for the purposes specified.

3. The steering mechanism, made with cords or rods that pass above but contiguous to the axis of motion of the horse, and connect at one end to the cross-head of the steering-wheel, and at the other end with the bridle or rein, as set forth.

Signed by me this 20th day of June, A. D. 1870.

W. L. WILLIAMS.

Witnesses:
    LEMUEL W. SERRELL,
    GEO. T. PINCKNEY.